UNITED STATES PATENT OFFICE.

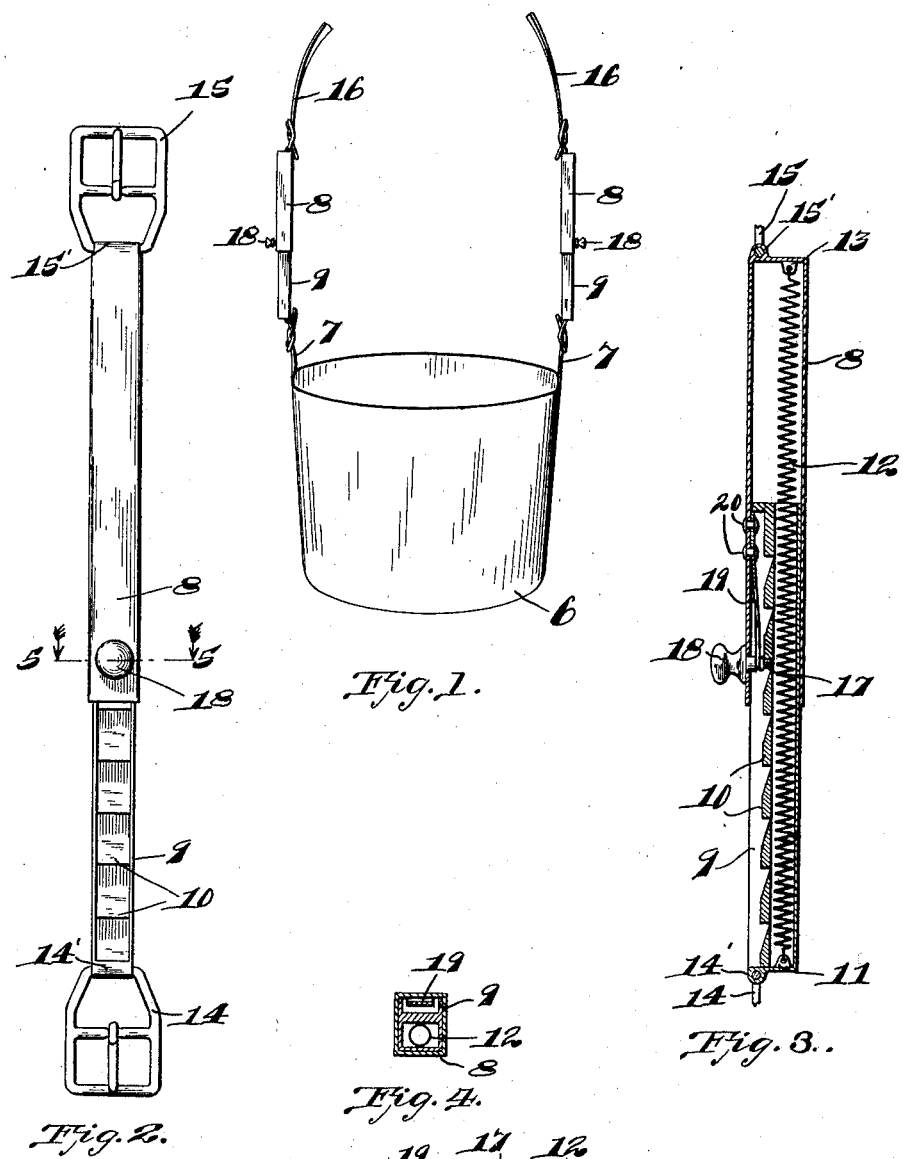

BENZION M. FIREMAN, OF CHICAGO, ILLINOIS.

ATTACHMENT FOR FEED-BAGS.

1,359,681.     Specification of Letters Patent.     Patented Nov. 23, 1920.

Application filed December 29, 1919. Serial No. 348,057.

*To all whom it may concern:*

Be it known that I, BENZION M. FIREMAN, a citizen of the United States, and a resident of the city of Chicago, county of Cook, and State of Illinois, have invented certain new and useful Improvements in Attachments for Feed-Bags, of which the following is a specification.

My invention relates to new and useful improvements in attachments for feed bags, and has for its object the provision in a feed bag of means for maintaining the bottom of the feed bag close to the nose of the animal using the same.

Another object is means for automatically adjusting the position of a feed bag with respect to the animal using the same, while in use.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevational view, showing my invention applied to a feed bag, Fig. 2 is a front elevational view of my invention, Fig. 3 is a central vertical sectional view of my invention, Fig. 4 is a transverse sectional view of my invention, and Fig. 5 is a sectional view taken on substantially line 5—5 of Fig. 2.

My invention is designed primarily for use with a feed bag, such as is used for feeding grain to horses, in which the feed bag containing the feed is strapped to the head of the horse, and the nose of the animal placed therein. With feed bags as now ordinarily constructed, the strap is passed over the head of the horse and buckled to one side of the bag, the opposite end of the strap being permanently fastened to the bag. In buckling the strap over the head of the horse, the feed bag is raised until the grain contained therein is in contact with the nose of the animal. After a portion of the feed has been consumed by the animal, its nose is no longer in contact with the feed, and animals generally are accustomed to shake their heads violently in order to reach the feed and thereby scatter a portion of the grain out over the sides of the feed bag, thereby wasting the same. With my invention, the feed bag is inserted upon the nose of the animal in the usual manner and strapped in position, so that the grain is in contact with the nose of the animal. My invention consists in means for automatically moving the feed bag into closer relation to the nose of the animal as the feed is consumed.

To this end, I provide a tubular housing 8, which is open at its lower end. Slidably positioned within the member 8 is a channel-shaped slide member 9, which has rigidly mounted to its side walls and extending longitudinally thereof a rack bar, which is provided with shoulders or ratchet teeth 10. Mounted upon the inner surface of the lower end of the member 9 is a lug 11, to which one end of a spiral spring 12 is attached, the opposite end of the spring 12 being attached to a lug 13 which is mounted upon the inner surface of the upper end of the casing or shell 8. Provided upon the lower end of the member 9 is a knuckle 14', in which a buckle 14 is mounted. Formed upon the upper end of the member 8 is a knuckle 15', in which a buckle 15 is mounted. In operation, the bag 6 is provided at opposite sides with a short strap 7 to each of which a buckle 14 is secured. A strap 16 is used, which passes over the head of the animal, the opposite ends of said strap being secured in the buckles 15 which are provided upon the members 8, it thus appearing that two of the members 8 are used with the feed bag 6, these members being disposed on the opposite sides of said bag. The member 8 is provided adjacent its lower end with an orifice through which a pawl 17 projects. Mounted upon said pawl at the outer side of the member 8 is a button or stud 18, by means of which the pawl 17 may be retracted. Secured to the pawl 17 is a leaf spring 19, said spring being mounted upon the member 8 by rivets 20 or other suitable means. The construction is such that the pawl 17 is normally retained in engagement with the members 10 and may be retracted upon an outward pull being exerted upon the members 18, so as to dis-engage with the members 10. In use, the grain is placed within the feed bag 6 and the strap 16 is passed over the head of the animal. The pawl 17 is then retracted and the feed bag lowered until the grain is in contact with the nose of the animal. The pawl is then released so as to engage against the rack bar, upon which the teeth 10 are formed. The strap 16 is so adjusted that when the animal begins to feed, the member 9 is pulled downwardly partially out of the member 8, so as to place the spring 12 in tension. While the animal is feeding, the bag 6 is held in fixed relation to the head of the animal so far as the downward movement is concerned, inasmuch as the force exerted by the animal upon the feed bag is resisted by the teeth 10 and the pawl 17. As the grain is consumed, the feed bag is lifted or brought into closer relation to the nose of the animal, owing to the tension of the spring 12 which raises the bag 6, as will be readily understood. In this way the necessity for the animal shaking his head is eliminated with the consequent obviating of the waste of grain.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. A device of the class described comprising a casing; a supporting member slidably mounted in said casing; means for preventing outward movement of said supporting member with respect to said casing; and resilient means for sliding said supporting member inwardly with respect to said casing, substantially as described.

2. A device of the class described comprising a casing; a supporting member slidably mounted in said casing; resilient means for moving said supporting member slidably in said casing in one direction; means for preventing the slidable movement of said supporting member with respect to said casing in the other direction; and means for securing said casing to a feed bag, substantially as described.

3. In combination with a feed bag, a supporting member; a casing adapted to be secured to the end of said supporting member; means slidably mounted in said casing and adapted to be secured to a feed bag; resilient means for resisting the slidable movement of said means with respect to said casing in one direction; and means for resisting the slidable movement of said means in the opposite direction, substantially as described.

4. In combination with a feed bag, a supporting member; and means adapted to be connected to said feed bag and to said supporting member for adjusting the relative position of said feed bag with respect to said supporting member, substantially as described.

5. In combination with a feed bag, a supporting member; telescoping means adapted to be secured to said feed bag and said supporting member; and means carried by the telescoping means for adjusting the relative distance between the member and the bag, substantially as described.

6. A device of the class described comprising a casing; means for connecting one end of said casing to a strap; a telescoping member mounted in said casing; means for connecting one end of said telescoping member to a feed bag; and means normally preventing outward movement of said member from said casing, substantially as described.

7. A device of the class described comprising a casing; means for connecting one end of said casing to a strap; a telescoping member mounted in said casing; means for connecting one end of said telescoping member to a feed bag; means normally preventing outward movement of said member from said casing; and means for collapsing said member within said casing, substantially as described.

8. A device of the class described comprising a casing; means for connecting one end of said casing to a strap; a telescoping member mounted in said casing; means for connecting one end of said telescoping member to a feed bag; and positively acting means adapted to prevent outward movement of the telescoping member with respect to the casing, substantially as described.

9. A device of the class described comprising a casing; means for connecting one end of said casing to a strap; a telescoping member mounted in said casing; means for connecting one end of said telescoping member to a feed bag; and pawl and rack mechanism adapted to prevent outward movement of the telescoping member with respect to the casing, substantially as described.

10. A device of the class described comprising a casing; means for connecting one end of said casing to a strap; a telescoping member mounted in said casing; means for connecting one end of said telescoping member to a feed bag; pawl and rack mechanism adapted to prevent outward movement of the telescoping member with respect to the casing; and a spring adapted to move the telescoping member yieldingly inward, substantially as described.

In testimony whereof I have signed my name to this specification in the presence of two subscribing witnesses.

BENZION M. FIREMAN.

Witnesses:
 JOSHUA R. H. POTTS,
 ROSE K. TRIB.